Feb. 13, 1940.  E. M. ORBECK  2,190,626
RESETTING MEANS FOR LIQUID DISPENSING APPARATUS
COMPUTING REGISTERING MECHANISM
Filed May 27, 1937   11 Sheets-Sheet 2
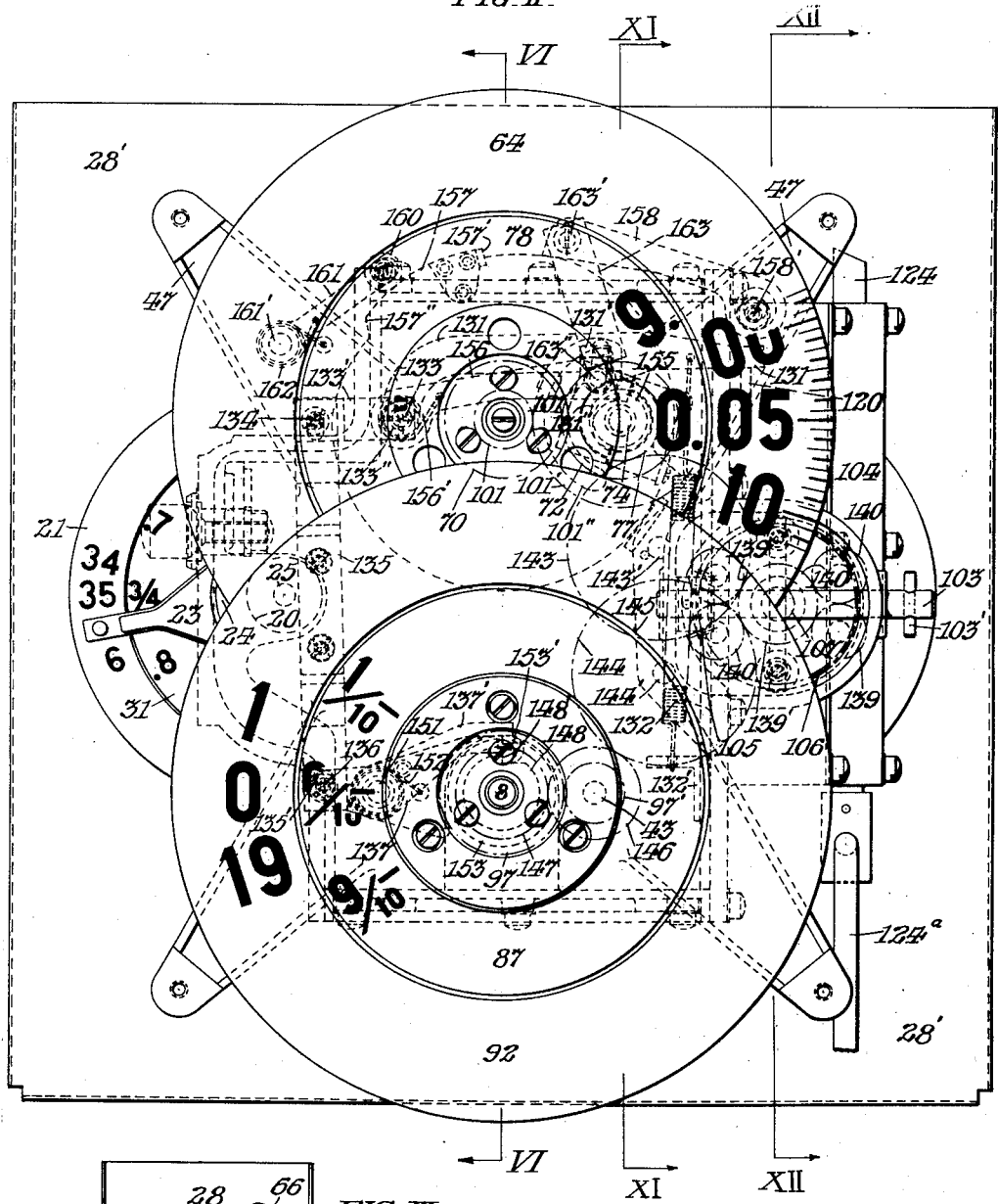
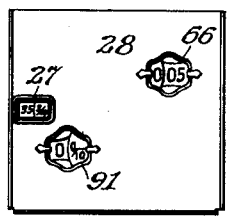
INVENTOR:
EINAR M. ORBECK,
BY Feb. 13, 1940.   E. M. ORBECK   2,190,626
RESETTING MEANS FOR LIQUID DISPENSING APPARATUS
COMPUTING REGISTERING MECHANISM
Filed May 27, 1937   11 Sheets-Sheet 3
FIG. IV.
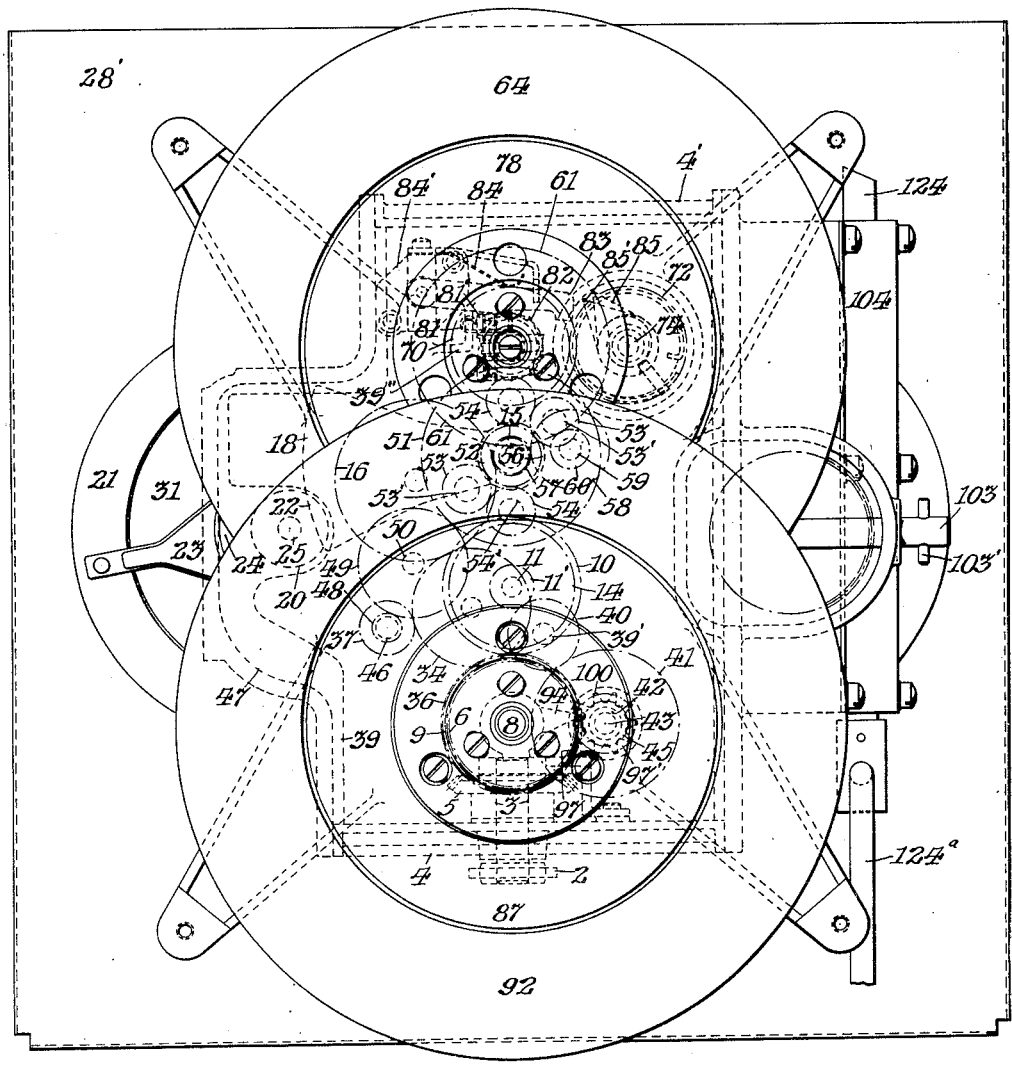
INVENTOR:
EINAR M. ORBECK,
BY

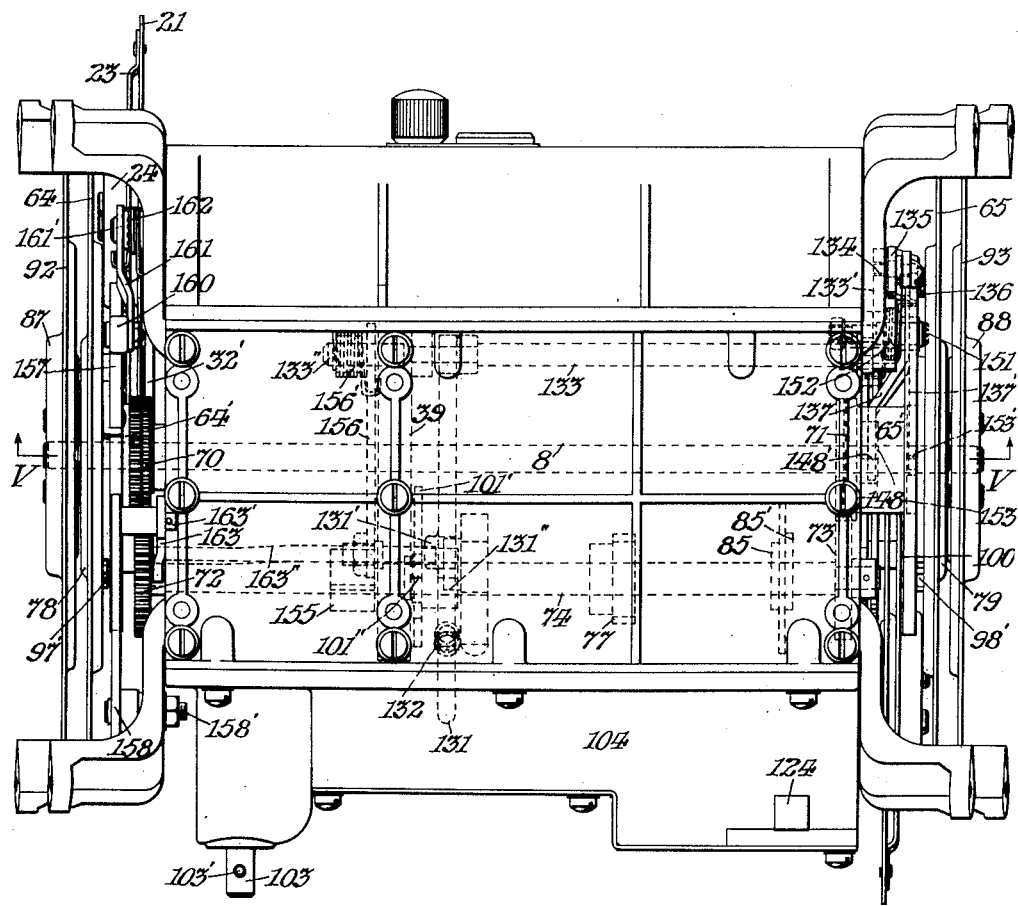

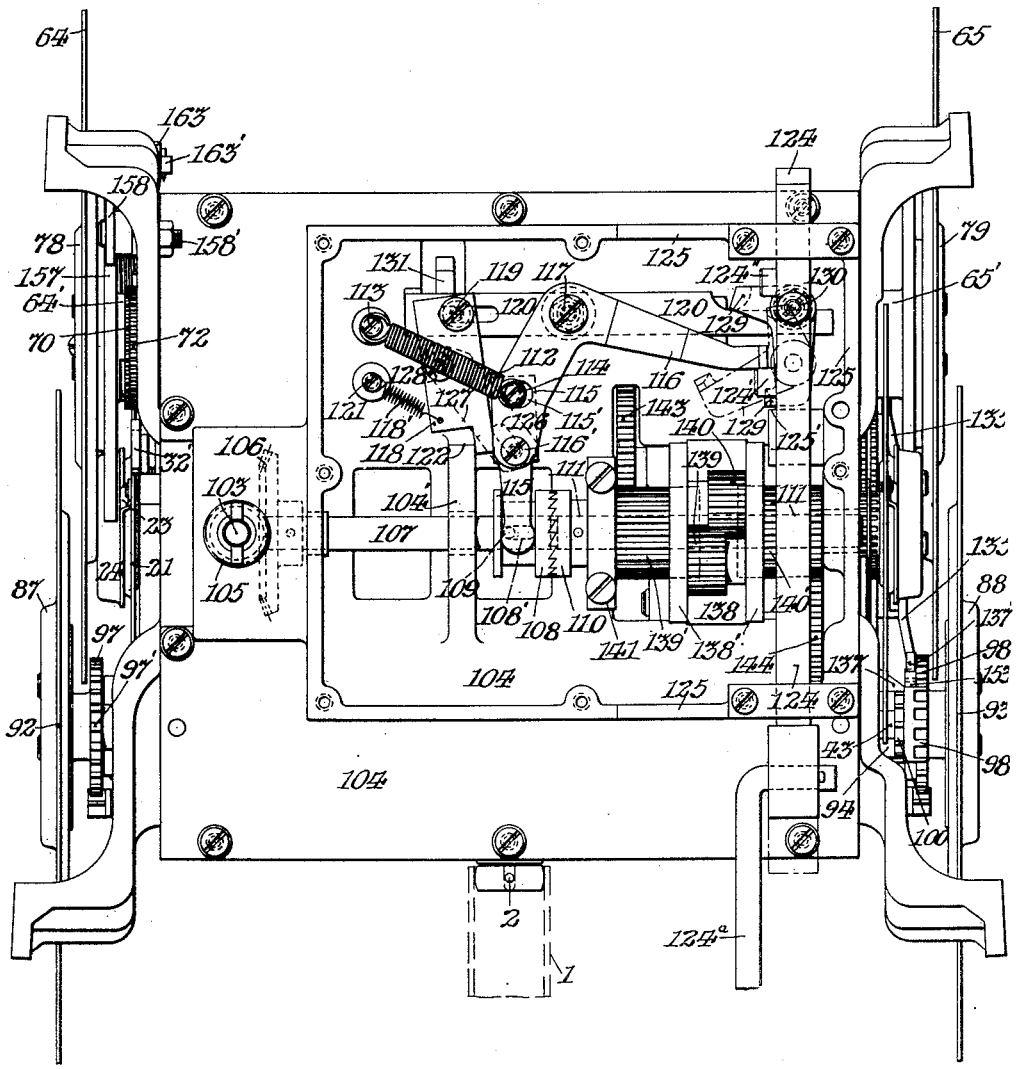

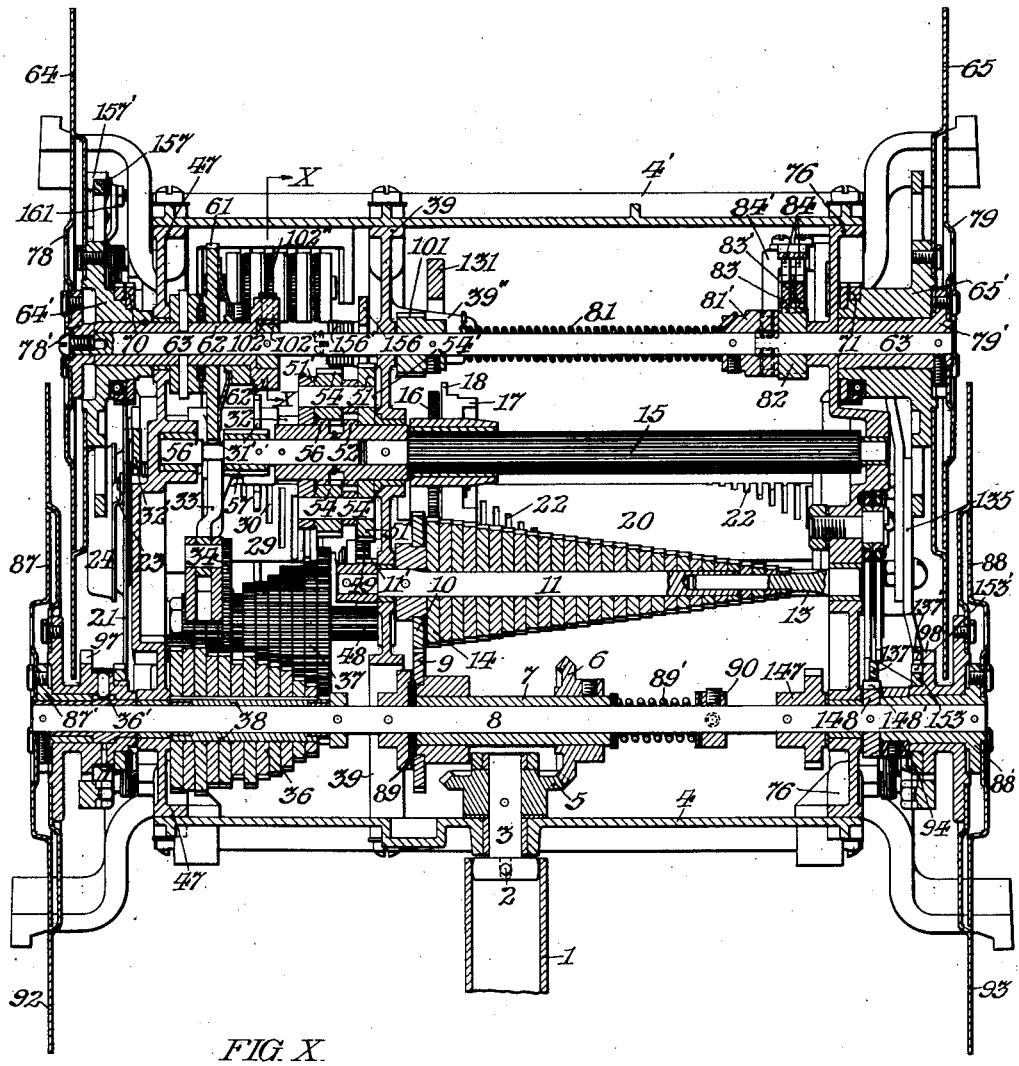

Feb. 13, 1940.  E. M. ORBECK  2,190,626
RESETTING MEANS FOR LIQUID DISPENSING APPARATUS
COMPUTING REGISTERING MECHANISM
Filed May 27, 1937   11 Sheets-Sheet 6
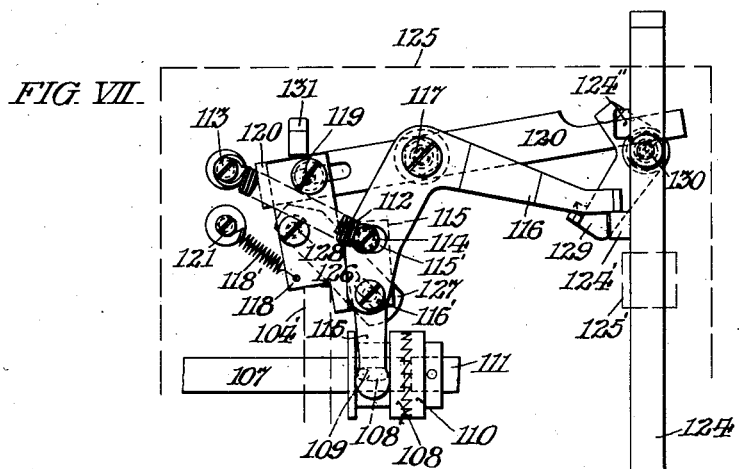
FIG. VII.
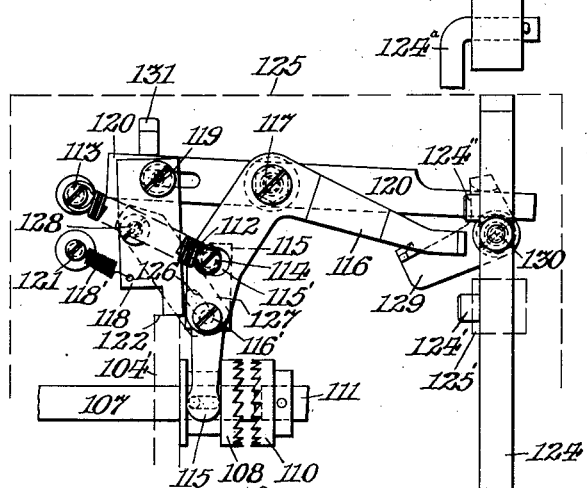
FIG. VIII.
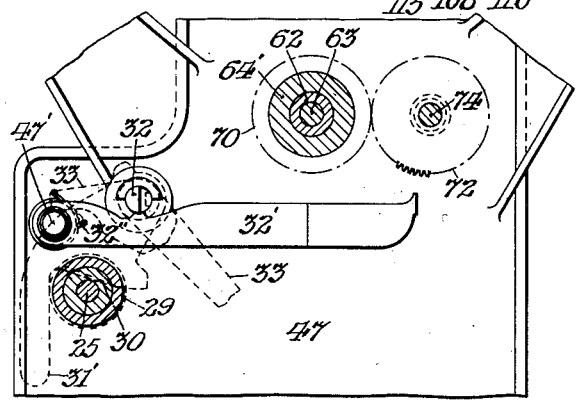
FIG. IX.
INVENTOR:
EINAR M. ORBECK,
BY

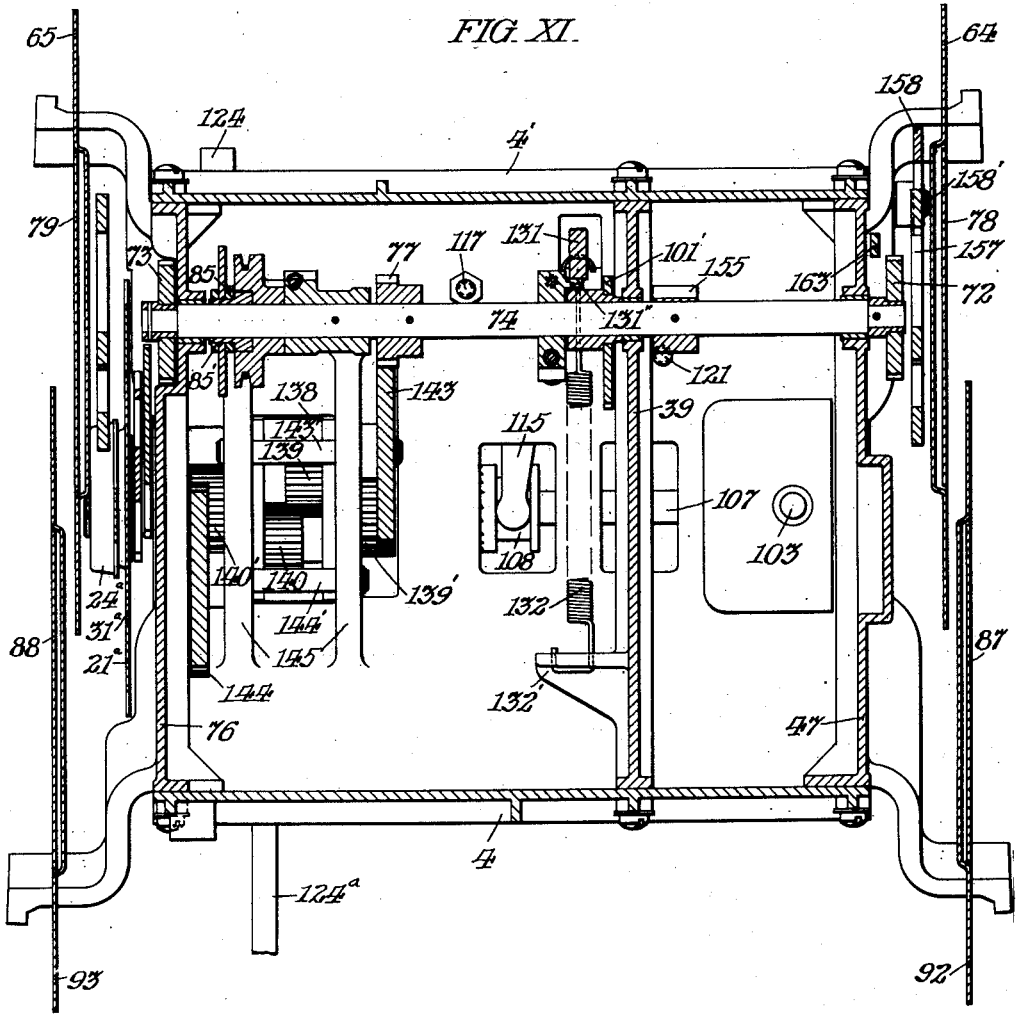

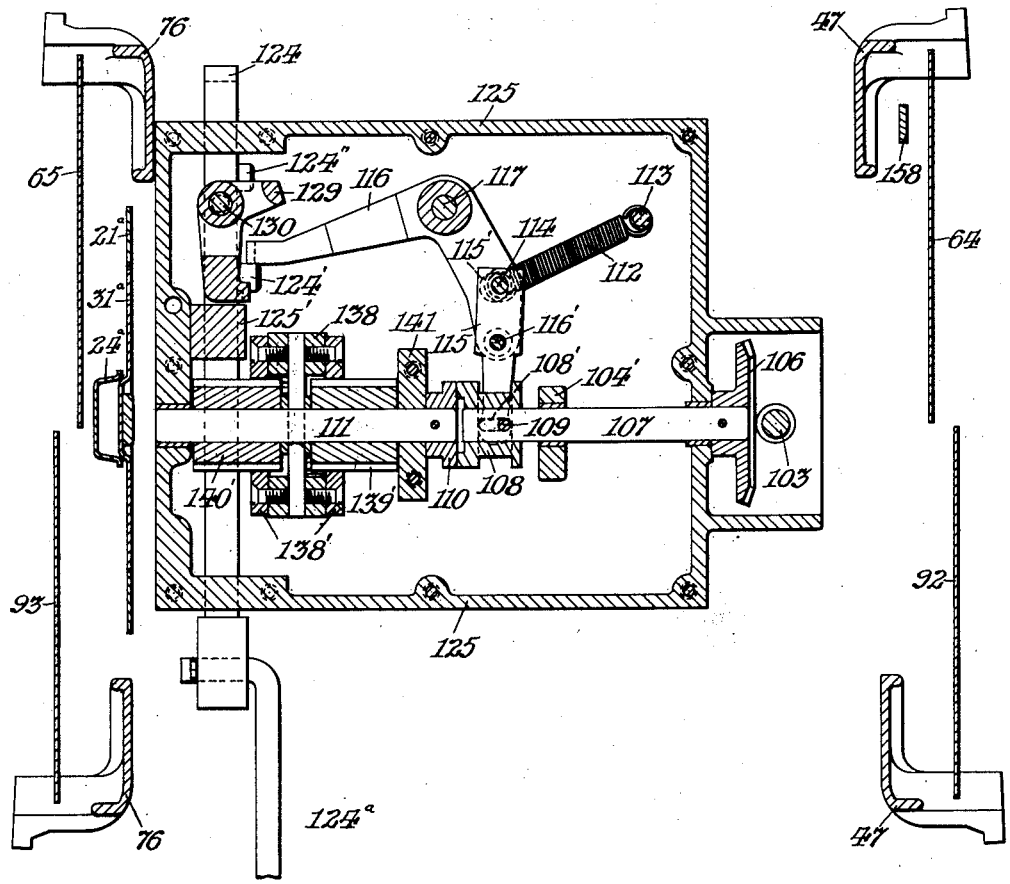
FIG. XII.

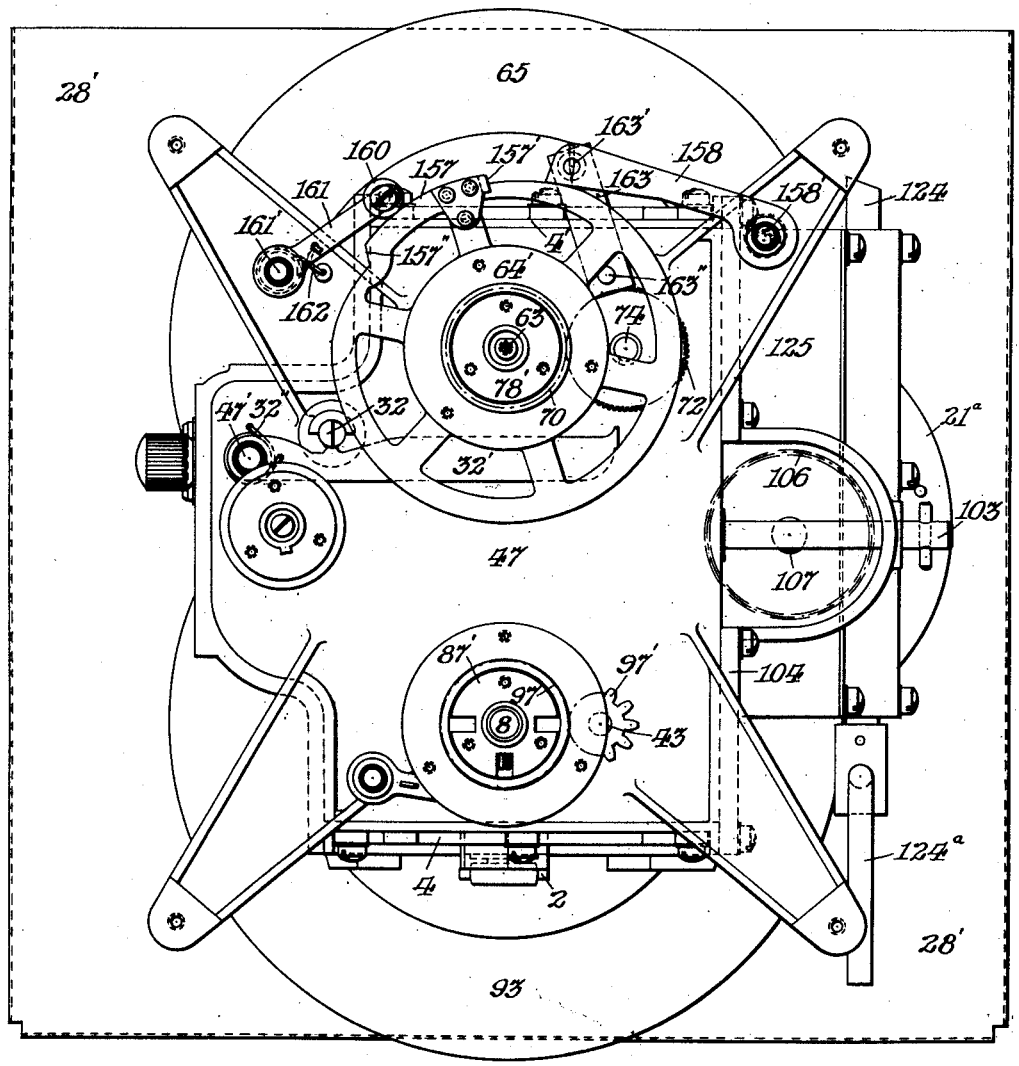
FIG. XIII.

Feb. 13, 1940.  E. M. ORBECK  2,190,626
RESETTING MEANS FOR LIQUID DISPENSING APPARATUS
COMPUTING REGISTERING MECHANISM
Filed May 27, 1937  11 Sheets-Sheet 10
FIG. XIV.
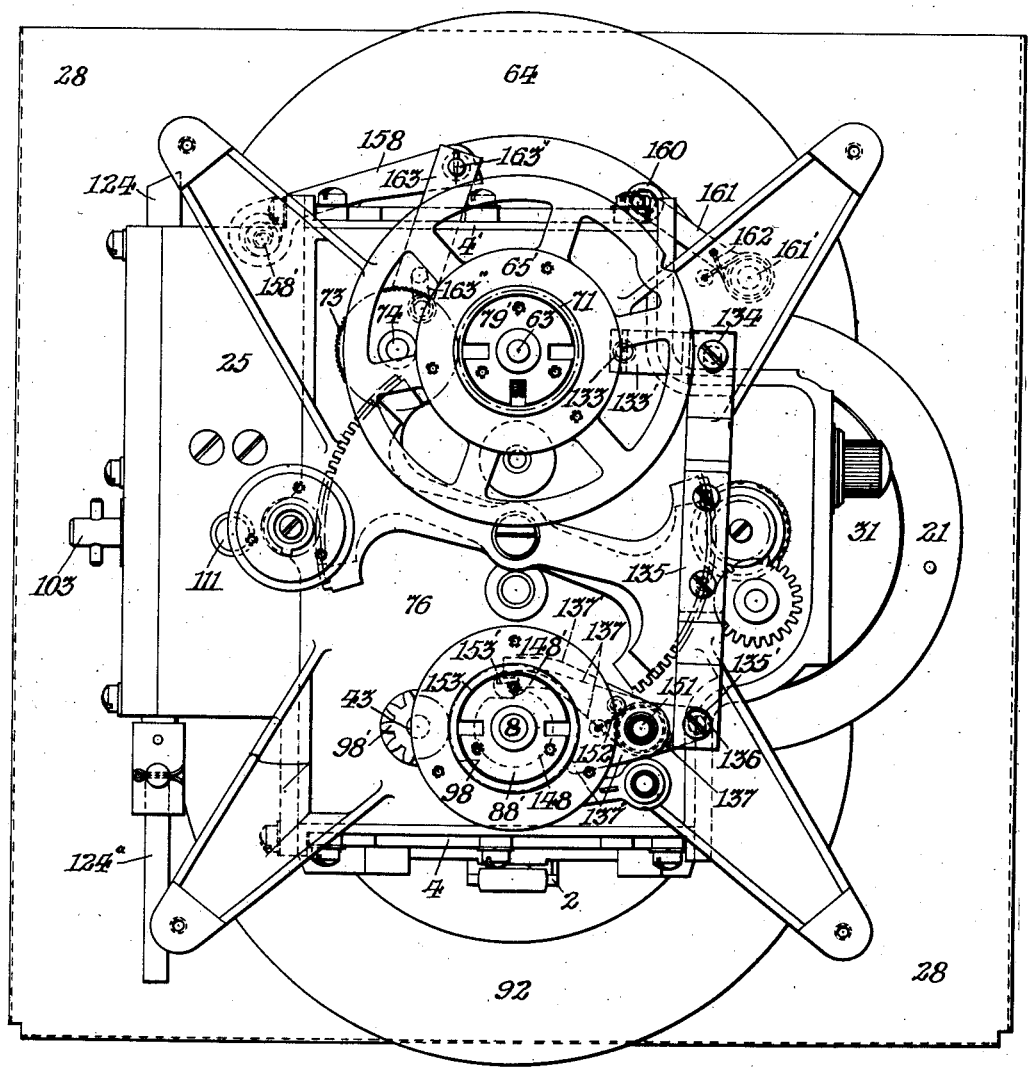
INVENTOR:
EINAR M. ORBECK,
BY Feb. 13, 1940.    E. M. ORBECK    2,190,626
RESETTING MEANS FOR LIQUID DISPENSING APPARATUS
COMPUTING REGISTERING MECHANISM
Filed May 27, 1937    11 Sheets-Sheet 11
FIG. XV.
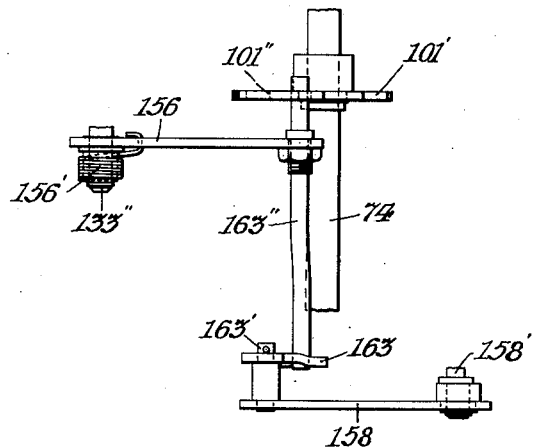
FIG. XVI.
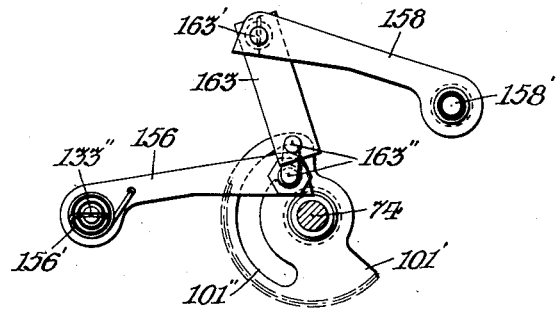
INVENTOR:
EINAR M. ORBECK,
BY Arthur E. Paige
Atty.

Patented Feb. 13, 1940

2,190,626

UNITED STATES PATENT OFFICE 2,190,626

RESETTING MEANS FOR LIQUID DISPENSING APPARATUS COMPUTING REGISTERING MECHANISM

Einar M. Orbeck, Norristown, Pa., assignor to John Wood Manufacturing Company, Inc., Conshohocken, Pa., a corporation of Delaware Application May 27, 1937, Serial No. 145,056

3 Claims. (Cl. 235—144)

My invention is particularly applicable to metering pumps for dispensing gasolene and of the general character illustrated in Letters Patent of the United States No. 2,062,997, granted December 1, 1936 to me as assignor to John Wood Manufacturing Company, Inc., of Conshohocken, Pennsylvania.

Such computing registering mechanism includes means for indicating any selected price basis of the computation, means for indicating the volume of liquid dispensed at each operation, in gallons and fractions of a gallon; means for computing and registering the value of the volume dispensed at each dispensing operation in cents and fractions of a cent; and means for indicating such value. To insure correct computation it is necessary to have the mechanism manually set with reference to a selected price and to have both the volume and value indicators at their zero position before beginning any dispensing operation. Therefore, my present invention provides distinct but cooperative devices which may be termed locking means, for respectively insuring those three conditions of the mechanism before the operator can initiate any dispensing operation.

My invention includes the various novel features of construction, arrangement and method of operation hereinafter more definitely specified.

In the drawings: Fig. I is a plan view of the computing registering mechanism, having oppositely counterpart indicating means at both the left and right hand sides thereof, but omitting the rectangular face plates which have windows for displaying portions of the numbered indicating dials.

Fig. II is an elevation of the left hand side of the mechanism shown in Fig. I, with the rectangular face plate omitted but showing the back of the face plate which is presented at the right hand side of Fig. I.

Fig. III is an elevation of the face plate omitted from Fig. II but shown on a smaller scale.

Fig. IV is a view similar to Fig. II but showing in dotted lines internal mechanism which is omitted from Fig. II for clarity of illustration.

Fig. V is an elevation of the side of said mechanism presented at the lower portion of Fig. I.

Fig. VI is a vertical sectional view of said mechanism taken on the line VI, VI in Fig. II in the direction of the arrows on that line.

Figs. VII and VIII are elevations of parts of the clutch shifting mechanism shown in Fig. V but in respectively different positions.

Fig. IX is an elevation of the interlocking mechanism between the fractional cent price indicating dial and the computing registering mechanism.

Fig. X is a fragmentary vertical sectional view, taken on the line X, X in Fig. VI in the direction of the arrows on that line.

Fig. XI is a vertical sectional view taken on the line XI, XI in Fig. II, in the direction of the arrows on said line.

Fig. XII is a vertical sectional view taken on the line XII, XII in Fig. II in the direction of the arrows on said line.

Fig. XIII is an elevational view taken from the same side as Figs. II and IV, but with the dials removed.

Fig. XIV is an elevational view taken from the opposite side of Figs. II and IV, but with the dials removed.

Fig. XV is a fragmentary plan view of parts of the mechanism as shown in dotted lines in Fig. I.

Fig. XVI is an end elevation of the parts shown in Fig. XV, as indicated in dotted lines in Fig. II.

The liquid to be dispensed is conveniently stored in an underground tank from which it is elevated by the operation of a pump actuated by an electric motor. The liquid passes through the meter which includes a rotor which is turned by the passage of liquid from the pump, on its way to the dispensing hose. Said rotor makes one revolution for each gallon of liquid passed through said meter and is indicated at 1 in the drawings, and is the driving element for the computing registering mechanism with which it is detachably connected, conveniently, by the cross pin 2 on the shaft 3 shown in Fig. VI. Said shaft 3 is journaled in the bottom plate 4 of a rectangular housing in which the computing registering mechanism is mounted. Said shaft 3 carries the bevel driving gear 5 which is in mesh with the bevel gear 6 fixed on the tubular shaft 7 which is mounted to turn on the shaft 8 and carries the gear 9 in mesh with the gear 10 on the shaft 11. The arrangement is such that said shaft 11 is turned one revolution by each revolution of the meter shaft 1, and consequently, said shaft 11 makes one revolution for each gallon of liquid passed through the meter. Said shaft 11 carries and is keyed to a conical assemblage of thirty gears including opposite end gears 13 and 14 respectively corresponding with the lowest and highest whole cents price of the liquid dispensed. In the embodiment of my invention illustrated, the price range of whole cents is from six cents to thirty-five cents per gallon.

Any one of said thirty gears may be selectively connected with the long pinion 15 by which the dials indicating the amount of sale, i. e., the value of the volume of liquid dispensed, are turned, as hereinafter described. Such selective connection is effected by the gear 16, which is carried by the rocker frame 17 so that it may be manually lifted to and from engagement with any selected gear in the conical series 13 to 14. Said frame 17 carries the blade 18 which extends as shown in Fig. IV into an arcuate slot in the interlocking sleeve 20, which latter controls the whole cents price display dial 21 shown at the left in Fig. II. The similar dial at the opposite side of the housing is marked 21ª in Figs. XI, XII, and XIII, and its hub is marked 24ª in Figs. XI and XII. Said sleeve 20 includes a series of thirty such arcuate slots 22 in its periphery, of which several are shown in Fig. VI. Said slots 22 are so disposed in spaced relation circumferentially as to correspond with the whole cents of the price "6" to "35" on said dial 1, and axially as to correspond with the gears of the conical series 13 to 14 inclusive.

As indicated in Fig. II, said dial 21 is in fact a ring having the diametrical cross plate 23 connecting it with its axial hub 24 and shaft 25; one end of said cross plate being between the numbers "6" and "35" as shown in Fig. II, and the other end of said cross plate being between the numbers "20" and "21" upon the opposite side of dial 21. Interruption of the regular spacing of said numbers on the dial 21 by the interposition of the ends of said plate 23 necessitates a corresponding irregularity in the circumferential spacing of said slots 22 in said sleeve 20. Said sleeve 20 is rigidly connected with the shaft 25 so that said sleeve may be manually turned to display a selected cents number of the price on said dial 21 at the price display window 27 in the face plate 28 shown in Fig. III and at the same time locate the proper slot in the series 22 in position to receive said blade 18 when said gear 16 is in mesh with the proper price gear of the series 13 to 14 on said shaft 11. As shown in Fig. VI, gear 16 is in mesh with the gear 14, representing the displayed price of "35" cents per gallon as indicated in Figs. II and III.

Said sleeve 20 has at the right hand end thereof in Fig. VI a ratchet head with thirty depressions in its circumference to selectively engage a spring pressed ball detent, to prevent accidental rotary displacement of said sleeve from any selected position to which it is manually adjusted. That construction is not shown in this case, for it is part of the subject matter of the copending application Serial No. 750,805 filed October 31, 1934, by Joseph C. Woodford for Letters Patent of the United States for Computing registering mechanism for liquid dispensing apparatus wherein the construction and arrangement of the price display mechanism including the interlocking sleeves such as 20 and 29 are claimed. Although the details of construction and arrangement of the price display mechanism are not herein claimed; it may be observed that the similar interlocking sleeve 29 has twelve arcuate slots 30 indicated in Fig. VI and controls the fractional cent price display dial 31 indicated in Fig. II. Said dial 31 is mounted to turn freely on the left hand end of said shaft 25 which, as above noted, is rigidly mounted in said sleeve 20. The similar dial at the opposite side of the housing is marked 31ª in Figs. XI and XII. As indicated in Fig. II, said dial 31 has a circular series of numerals thereon indicating fractions of a cent for display through said window 27. As indicated in Figs. II and III, the fraction display is "¾".

Said slots 30 in the locking sleeve 29 are adapted to receive the blade 31', indicated in Fig. VI, which is prevented from axial movement in the housing of which said bottom plate 4 is a part. The shaft 32 is the pivot of the rocker frame 33 which carries the selector gear 34, so that the latter may be manually lifted and slid axially by tilting and axially moving said frame 33 to present said gear 34 in mesh with any two opposite gears in the two conical assemblages of gears 36 and 37, which are disposed for cooperation, to effect correct computation. Said shaft 32 cooperates with the detent lever 32', hereinafter described, to prevent operation of the computing registering mechanism unless and until said blade 31' is properly seated in any selected slot 30 in said locking sleeve 29.

As shown in Fig. VI; said assemblage of gears 36 is keyed in rigid connection with the sleeve 38 which is journaled on said shaft 8, as shown in Fig. VI, and is connected by a train of gearing so as to be driven by the shaft 11 of the conical assemblage of gears 13, 14. That train includes the pinion 11' on said shaft 11, indicated in dash and dot lines in Fig. IV, which pinion adjoins the intermediate housing frame plate 39 in which the left hand end of said shaft 11 is journaled, as shown in Fig. VI. Said pinion 11' is in mesh with the idle gear 40 journaled on the stationary stud 39' fixed in said frame 39. Said gear 40 is in mesh with the gear 41, shown in dash and dot lines in Fig. IV, which is rigidly connected with the sleeve 42, which is loosely journaled on the shaft 43, shown in dotted lines in Fig. IV. Said sleeve has at its left hand end, with reference to Fig. VI, the gear 45 which is in mesh with the left hand end gear of the assemblage 36. Consequently, said assemblage 36 is thus turned by connection with the meter shaft 1, by way of said shaft 11, as shown in Figs. IV and VI.

Said assemblage of gears 37 is rigidly connected with the shaft 46, shown in dotted lines in Fig. IV. Shaft 46 is journaled in the left hand end frame plate 47 and said intermediate frame plate 39, shown in Fig. VI. Said shaft 46 has formed thereon, adjoining said intermediate frame 39, the pinion 48, shown in Fig. VI and indicated in dash and dot lines in Fig. IV. Said pinion 48 is in mesh with the idle gear 49 which is journaled on the shaft 50 fixed in said intermediate frame 39, and said idle gear 49 engages the carrier gear 51 of the planetary gear train shown in section in Fig. VI.

Said planetary gear train includes the sun gear 52, which is fixed on the left hand shaft end of the long pinion 15 and is in mesh with the pair of diametrically opposite planetary gears 53, shown in dash and dot lines in Fig. IV, which are respectively journaled on studs 53' fixed in said carrier gear 51 at one end and in the ring 51' at the other end, as shown in Fig. VI. Said planetary gears 53 are in mesh with the respective gears of a diametrically opposite pair 54, shown in dot and dash lines in Fig. IV, and in section in Fig. VI, which are journaled on studs 54' fixed in said carrier gear 51 at their right hand ends shown in Fig. VI and which are fixed at their left hand ends in the carrier ring 51'.

As shown in Fig. VI, said planetary gears 54 are in mesh with the second sun gear 56 which is in coaxial relation with said long pinion 15 and first sun gear 52. As shown in Fig. VI, said sun gear 56 is rigidly connected with the shaft 56' which is journaled at its right hand end in said first sun gear 52 and at its left hand end in said housing end frame plate 47. Said shaft 56' has rigidly connected therewith the pinion 57 in mesh with the idle gear 58 journaled on the stud shaft 59 fixed in said housing frame plate 47. Said idle gear 58 has in unitary relation therewith the gear 60, shown in dash and dot lines in Fig. IV, and which is in mesh with the gear 61, indicated in dash and dot lines in Fig. IV, and in section in Fig. VI. As shown in Fig. VI, said gear 61 is carried by the sleeve 62 journaled on the shaft 63 and which is rigidly connected with the cents dial 64, shown in elevation in Fig. II and in section in Fig. VI; said dial 64 is operatively connected with the oppositely counterpart dial 65 at the opposite, right hand, side of the mechanism shown in Fig. VI; so that the aggregate movements imparted to said pinion 57 as above described are manifested by rotation of said cents dials 64 and 65, and the number displayed at the right hand side of said dial 64 at its horizontal diameter, for instance "05" in Fig. II, is displayed at the window 66 in the face plate 28, as shown in Fig. III, and also at a corresponding window in the opposite face plate 28'.

Said gear 61 is only frictionally engaged with said sleeve 62, by the spring 62', as shown in Fig. VI, in order to permit said cents dials 64 and 65 to be set back to their zero position as hereinafter described. The hub 64' of said cents dial 64 and the hub 65' of said cents dial 65 are respectively provided with double gears 70 and 71, shown in section in Fig. VI. Said gears are respectively in mesh with gears 72 and 73 which are only indicated in dash and dot lines in Fig. II, but which are precisely alike and rigidly connected with the shaft 74 indicated by dotted lines in Figs. I, II, and IV; which shaft is journaled in the three housing frame plates 39, 47, and 76, the latter being shown at the right hand side of Fig. VI. Said shaft 74 has the setback gear 77 thereon, indicated by dash and dot lines in Fig. II, by which said dials 64 and 65 may be set back to zero position, as hereinafter described.

As shown in Fig. VI, said shaft 63 has rigidly connected with its opposite ends, oppositely counterpart dollars dials 78 and 79, both of which are shown in Fig. VI; the dial 78 being shown in Fig. II. Each of said dollars dials has a circular series of ten numbers thereon; viz., "1." to "9." and "0.". Said dollars dials are rigidly connected with respective hubs 78' and 79', fixed on said shaft 63, as indicated in Fig. VI. Said shaft 63 is continually stressed by the helical spring 81 which encircles it, as shown in Fig. VI, which is anchored at its left hand end to the bracket 39'' projecting from said intermediate frame plate 39, and is connected at its right hand end with the collar 81' fixed on said shaft 63; so that said spring continually tends to turn shaft 63 and dials 78 and 79 away from zero position. However, said spring 81 is controlled by an escapement including the ratchet wheel 82, shown in section in Fig. VI, on the shaft 63 and the two pawls 83 and 83', also shown in section in said figure, having the bifurcated spring 84 continually stressing them into engagement with said ratchet. As shown in dotted lines in Fig. IV, said spring 84 is rigidly connected at its left hand end with the bracket 84' which is rigidly connected with said frame plate 76. Said pawls 83 and 83' are arranged to be tripped in succession by tappets 85 and 85', shown in dotted lines in Fig. IV on said shaft 74. The effect of that arrangement is such that upon each rotation of said shaft 74, which corresponds with a complete revolution of said cents dials 64 and 65; said tappets release said shaft 63 and permit it to be turned by said spring 81 to the extent of the angle between adjoining dollar numbers on said dials 78 and 79 to register an additional dollar of value for each revolution of said cents dials 64 and 65. The dollar number thus advanced is displayed at said window 66 in the face plate 28, as shown in Fig. III, and also at the corresponding window in the opposite face plate 28'.

However, said dial structures are the subject matter of Letters Patent of the United States No. 2,022,632 granted November 26, 1935, to Joseph C. Woodford as assignor to John Wood Manufacturing Company, Inc., assignee of the present application, and are not herein claimed.

Said shaft 8 has fixed upon its respectively opposite ends the oppositely counterpart fractional gallon dials 87 and 88, both of which are shown in Fig. VI; the dial 87 being shown in Figs. II and IV. Each of said dials 87 and 88 has a circular series of ten numerals thereon, respectively "0/10" and "1/10" to "9/10", which latter represent tenths of a gallon. The mark "0/10" represents both zero and a whole gallon. Said dials are normally turned by frictional connection of said shaft 8 with the tubular shaft 7 shown in Fig. VI, and the gear 9 in mesh with the gear 10. Such connection is effected by the friction disk 89 fixed on said shaft 8, against which the gear 9 is pressed by the spring 89' encircling said shaft 8 and compressed between the right hand end of said tubular shaft 7 and the abutment collar 90 fixed on said shaft 8. Such frictional engagement is merely to permit said shaft 8 to be set back to present said dials 87 and 88 in zero position at the gallonage display window 91 in the face plate 28, shown in Fig. III, and the corresponding window in the opposite face plate 28', shown in Figs. II and IV; said face plates being precisely alike. During such setback movement, by means hereinafter described, said shaft 7 is held stationary by its connection with the shaft 1 of the meter rotor which is then stationary. The whole gallon dials 92 and 93, both of which are shown in Fig. VI (the dial 92 being shown in Figs. II and IV), are journaled upon the hubs 87' and 88' of said fractional gallon dials 87 and 88, and the dial 93 is prevented from axial displacement by the hub of the tappet cam 94 which is held fast by a set screw to the hub 88' journaled on said shaft 8, as indicated at the right hand side of Fig. VI. Axial displacement of the hub 87', carrying the dial 92, is prevented by the hub 87' being retained in position abutting the frame plate 47 by means of the collar 36' which is pinned fast to said shaft 8. Said dials 92 and 93 have oppositely counterpart circular series of twenty numbers thereon from "1" to "19" and "0" representing twenty gallons, the mark "0" also representing the zero position of said dials. As said dials 92 and 93 are turned, the numbers thereon are respectively presented at said window 91 in the face plate 28 and at the corresponding window in said face plate 28'. To turn them I provide said dials 92 and 93 with the respective gears 97 and 98 which are respectively in mesh with the gears 97' and 98' on the gallon dials connecting shaft 43, shown in dotted lines in Figs. II and IV. Said shaft 43 is journaled in the opposite end plates 47 and 76 of the housing shown in Fig. VI, which are rigidly connected with said bottom plate 4 and the top plate 4'.

Said tappet cam 94 has but one tooth, as shown in dotted lines in Fig. IV; and being fixed on said hub 88', as aforesaid of the fractional gallon dials 87 and 88, makes one revolution for each gallon dispensed through the meter. Its single tooth is adapted to successively engage the ten teeth on the star wheel 100 shown in dotted lines in Fig. IV, which is on the right hand end of said shaft 43, with respect to Figs. I and V, and is conveniently in unitary relation with said gear 98'.

The relation of said tappet cam 94 and star wheel 100 is such that, at each revolution of said fractional gallon dials 87 and 88, said shaft 43 is turned 1/10 of a revolution and turns said gallon dials 92 and 93 1/20 of a revolution to register and indicate dispensation of a gallon. Said dials 92 and 93 are detained in each position to which they are thus shifted, by any convenient detent means, forming no part of the present invention.

As shown in Fig. VI; said shaft 63 has fixed thereon the pinion 101 in mesh with the sectoral gear 101' which is free to turn on said shaft 74, as shown in dotted lines in Fig. I and in dash and dot lines in Fig. II. When said dollar dials 78 and 79 are displaced from their initial position, by a dispensing operation; they are set back to zero by means of the pick-up, or plunger, pin 102 and the cam 102', which latter is pinned fast on the shaft 63 and is positioned in the recess in the enlarged head 62' of the sleeve 62, as shown in Figs. X and VI. As shown in Figs. X and VI, said pickup pin 102 is free to move through an opening in the head 62' of the sleeve 62, and said pickup pin is continually stressed toward the surface of the cam 102' by means of the leaf spring 102", which is fastened at one end to said head 62'.

The registering and indicating mechanism above described is arranged to be set back to zero position by clockwise rotation of the shaft 103 shown in Figs. I, II, and IV, conveniently by a tubular key or crank slotted to fit over the end of said shaft 103 in engagement with the cross pin 103' fixed in said shaft. Said shaft 103 is journaled in the housing side plate 104 which is rigidly connected with said bottom plate 4 and top plate 4'. As indicated in Figs. II and V; said shaft 103 has fixed thereon the bevel pinion 105 in mesh with the bevel gear 106, which latter is fixed on the shaft 107, journaled in said side plate 104.

As shown in Fig. V, said shaft 107 carries the ratchet clutch member 108 which is prevented from turning thereon by the engagement of its slot 108' with the cross pin 109 fixed in said shaft, but said clutch member 108 is axially movable to and from engagement with the complementary clutch member 110 which is fixed on the shaft 111 journaled in said plate 104.

Said clutch member 108 is continually stressed toward the left in Fig. V, to its disengaged position against the rib 104' on said plate 104, by the tension spring 112 which extends from the stud 113, fixed in said plate 104, to the stud 114 projecting from the upper end of the yoke lever 115 through the slot 115' in the bell crank clutch shifting lever 116. Said lever 115 is fulcrumed on the stud 116' fixed in the lower end of said lever 116, and the latter is fulcrumed on the stud 117 fixed in said plate 104. Said clutch member 108 is held in disengaged position during each dispensing operation by said tension spring 112.

The means for operating said clutch mechanism above described includes the operating bar 124 which, as shown in Fig. V, is mounted to reciprocate vertically in bearings in the top and bottom members of the box flange 125 on said housing plate 104. Said bar 124 is manually operative, by any convenient means, for instance, its lower end may be connected by the link 124ᵃ with a hook lever, which serves as a support for the liquid dispensing hose when the latter is in idle position; the arrangement being such that when the operator hangs the hose on said hook lever, which is not shown in the drawings, said operating bar 124 is thrust upward to the position shown in full lines, from the position indicated by dash and dot lines in Fig. V, the latter position being the position of said bar during the dispensation of liquid and corresponding with the disengaged position of said clutch member 108.

The detent latch 118 hangs on the pivot 119 fixed in the lever 120 which is also fulcrumed on said stud 117 fixed in said housing plate 104. Said detent latch 118 is continually stressed towards the left in Fig. V by its spring 118' engaging the stud 121 fixed in said plate 104. When said clutch member 108 is in disengaged position during each dispensing operation, the detent latch 118 is in the position shown in Fig. VIII, in which figure said latch 118 is shown pulled over the top of the shoulder 122 on the rib 104', by its spring 118'.

Said operating bar 124 has projections 124' and 124" extending from the left hand side thereof in Fig. V, for alternate engagement with the bottom and top of the right hand end of said clutch shifting lever 116. In the position shown in Fig. V, said projection 124' has lifted said clutch shifting lever to the uppermost limit of its movement. Said stud 116' which is the fulcrum of the yoke lever 115 projects into the slot 126 in the link 127 which is connected by the pivot 128 with said detent latch 118. Consequently, the upward movement of the right hand end of said clutch shifting lever 116 above described causes said link 127 to pull said detent latch 118 off of the shoulder 122 on the rib 104', where it has been detained by its spring 118' while said clutch member 108 is in disengaged position. Said operating bar also carries the latch 129 which is pivotally connected with said bar by the bolt 130 and which normally hangs in the position shown in dash lines in Fig. V when said operating bar is in its lower position corresponding with the disengaged position of said clutch. In that position, said latch 129 rides over the upper left hand corner of the lug 125' which is fixed on said box flange 125. However, as said operating bar 124 moves to the position shown in full lines in Fig. V, the extension on the lower end of said latch 129 encounters the undersurface of said clutch shifting bell crank lever 116, and said latch 129 is knocked down to the position shown in Fig. V if dispensation has been effected by the apparatus; in which knocked down position it overhangs the top of the lug 125' which then prevents accidental downward movement of said operating bar 124 and consequent release of said clutch member 108 until said latch 129 is released from its position overhanging said lug 125', by upward movement of the right hand end of said lever 120; consequent upon downward pressure of the lever 131, the end of which overhangs the left hand end of said lever 120, as shown in Fig. V; said lever 131 being continually stressed downwardly by the spring 132 which extends therefrom to the bracket 132' on the frame plate 39, as shown in dotted lines in Fig. II. Said lever 131 is rigidly connected with the shaft 133, shown in dotted lines in Figs. I and II, which is journaled in bearings in the intermediate housing plate 39 and right hand end housing plate 76, shown in Fig. VI, but is behind the shaft 63 in that figure. Said shaft 133 has at the right hand end thereof with respect to Figs. I and VI, the lever arm 133', shown in dotted lines in Figs. I and II. As shown in Fig. II, said lever arm 133' has connected with the pivot 134, the link 135 which has the slot 135' at its lower end connected with the pivot 136 on the lever 137, which is operated as hereinafter described.

Referring to Figs. II and V; said shaft 111 which carries the clutch member 110 is rigidly connected with the planetary gear carrier 138 comprising two rigidly connected parallel disks 138' in which are journaled pairs of intermeshed planetary gears 139 and 140. Said planetary gears 139, which are journaled in diametrically opposite positions in said carrier 138, as indicated in dash and dot lines in Fig. II; are in mesh with the sun gear 139' which is loosely journaled on said shaft 111 and extends through the left hand disk 138' of said carrier 138 to the rib 141 fixed on said housing plate 104. Said planetary gears 140, which are journaled in diametrically opposite positions in said carrier 138, as indicated in dash and dot lines in Fig. II, are in mesh with the other sun gear 140' which, as shown in Fig. V, is loosely journaled on said shaft 111 and extends through the right hand disk 138' of said carrier 138 and to the right hand vertical member of the box flange 125. Said sun gear 139' is in mesh with the gear 143 indicated by the dash and dot lines in Fig. II. Said gear 143 is loosely journaled on the shaft 143' which is supported in parallel flanges 145 projecting inwardly from the housing plate 104. Said sun gear 140' is in mesh with the gear 144 indicated in dash and dot lines in Fig. II. Said gear 144 is loosely journaled on the shaft 144' which is also supported in said parallel flanges 145.

As hereinafter described, said gear 144 is used to set back to zero position th gallonage dials 87 and 92 shown in Fig. II, and said gear 143 is used to set back to zero position the dials 64 and 78 which respectively indicate the cents and dollars value of the liquid dispensed at any operation. The planetary gear connection between said shaft 111 and said gears 144 and 143 is to permit the gallonage dials 87 and 92 to stop at their respective zero positions while the value indicating dials 64 and 78 are turned further to reach their respective zero positions. That is to say, when the operator turns the set back shaft 103, the first effect thereof is to reset the gallonage dials 87 and 92 to zero position, whereupon, said dials being stopped in such zero position, by means hereinafter described, said gear 144 becomes stationary and further turning movement of said set back shaft 103 effects rotation of said gear 143 until the value indicating dials 64 and 78 are set back to their respective zero positions, whereupon, they are stopped by means hereinafter described, and the gear 143 becomes stationary and said shaft 103 cannot be further rotated. However, when that condition is reached, consequent upon the resetting to zero of all of the indicating dials; said detent latch 129, shown in Fig. V, (which is in effect a lock which, in the position there shown, prevents any dispensing operation), is automatically released from its locking position over the lug 125', by clockwise rotation upon its pivot bolt 130, shown in Fig. V, by upward movement of the right hand end of said lever 120; so that said operating bar 124 is freed to be manually lowered at the initiation of the next dispensing operation.

Said gear 144, arranged to be driven as above described by the set back shaft 103, is continually in mesh with the gear 146, shown in dash and dot lines in Fig. II. Said gear 146 is journaled on said shaft 43 and in mesh with the gear 147 fixed on the shaft 8, as shown in section in Fig. VI and in dash and dot lines in Fig. II. As shown in dotted lines in Fig. II and in section in Fig. VI, said shaft 8 has fixed thereon the stop disk 148 having the stop notch 148' in its perimeter to engage the pendent right hand stop end of said lever 137, shown in dotted lines in Fig. II and in section in Fig. VI. Said lever 137 is fulcrumed on the stud 151 fixed in the housing plate 76, at the right hand end of Fig. VI and said lever 137 is continually stressed clockwise in Fig. II by the spring 152, shown in dotted lines in that figure. Said stop lever 137 is rigidly connected with the lever arm 137', shown in dotted lines in Fig. II and in section in Fig. VI, which normally rides upon the circular portion of the circumference of the cam 153, also shown in dotted lines in Fig. II and in section in Fig. VI; which cam has the notch 153' into which the pendent end of said arm 137' is permitted to drop and thereby release the stop lever 137 to drop into the notch 148' in time to stop the rotation of said gallonage dials when they reach their zero position, by rotation of said shaft 8.

Said setback gear 143, shown in Fig. V, is continually in mesh with said set back gear 77 on the shaft 74, shown in dotted lines in Fig. I; so that after said setback gear 144 has stopped as above described, manual rotation of the setback shaft 103, as above described, reversely rotates said shaft 74, and the dials 78 and 79 are set back to zero position by means of the pickup pin 102 and cam 102', as above described. Reverse rotation of said shaft 74 rewinds said spring 81, shown in section in Fig. VI, encircling said shaft 63; said spring 81 being fully rewound to its initial tension when the value indicating dials have reached their zero position.

The setting back movement of said shaft 74, effective with respect to said value indicating dials 64, 65, 78, and 79, is finally stopped when they all reach their zero position, by the stop cam 155, which is fixed on the shaft 74, as shown in dotted lines in Figs. I and II; when the radial shoulder on said cam encounters the right hand end of the stop lever 156, shown in dotted lines in Fig. II, which lever is fulcrumed on the stud 133''. Said lever 156 is continually stressed clockwise in Fig. II, toward said cam 155, by the spring 156', shown in dotted lines in Figs. I and II.

However, if the value dispensed is less than a dollar, at any dispensing operation, the dollar dials 78 and 79 are not displaced from their zero position.

Stop means for the cents dials 64 and 65 include the stop cam 157 which is rigidly connected with the cents dial 64, as shown in section in Fig. VI, and which has a single radial shoulder 157', shown in dotted lines in Fig. II, which encounters the left hand end of the stop lever 158 which is pivoted on the eccentric bolt 158' fixed in the frame plate 47, as indicated in dotted lines in Fig. II. The stop lever 158 may be adjusted with respect to said shoulder 157', on the stop cam 157, by movement of said eccentric bolt 158'. Moreover, as shown in dotted lines in Fig. II; said stop cam 157 has the cam shoulder 157" which, when said cents dials 64 and 65 and the cam 157 are turned to zero position, is presented at the right hand side of the stop roller 160 which is carried by the lever 161 fulcrumed on the stud 161' on said housing frame member 47, as indicated in dotted lines in Fig. II, and continually stressed clockwise to press said roller 160 toward said cam 157, by the spring 162. The function of that stop mechanism is to eliminate overthrow, due to momentum in the resetting operation, past the zero indication of the cents dials 64 and 65, which is an inherent condition because of backlash and consequent lost motion between said gears 72 and 73 and said spring loaded take-up gears 70 and 71.

However, I cooperatively connect said stop levers 158 and 156 by the link 163 which is pendent from the pivot 163' fixed in said stop lever 158, as indicated in dotted lines in Fig. II, and which carries at its lower end, the left hand end of the cross bar 163" (with reference to Fig. I) which is rigidly fixed in the right hand end of said stop lever 156 (with reference to Fig. II), with the effect that when said stop lever 156 is uplifted from its engagement with the stop cam 155, said stop lever 158 is uplifted from the stop cam 157 also.

As shown in Figs. XV and XVI: The right hand end of said cross bar 163" (with reference to Fig. I), extends into the cam slot 101" in the sectoral gear 101', as indicated in dotted lines in Figs. I and II, which slot has a notch at its upper end, shown in Fig. II, into which said cross bar drops to permit the stop levers 156 and 158 to assume their lowermost position, in which they cooperate with their respective stop cams 155 and 157, as above described. Turning of said shaft 74 with stop cam 155 clockwise in Fig. II, consequent upon operation of said meter, lifts said cross bar 163" out of said notch in the slot 101", uplifts both stop levers 156 and 158 to idle position and holds them there, until said notch is again presented in the position shown in Fig. II, by manipulation of said setback shaft 103.

Moreover, if liquid is dispensed to a value of $1.00 or more, the end of said cross bar 163" which extends through said slot 101" in the sectoral gear 101', as shown in dotted lines in Fig. I, and in full lines in Fig. XV, projects under the lug 131' on said lever 131 so as to uphold the latter whenever said cross bar is upheld as above described. Furthermore, on said shaft 74 is secured the semi-circular cam surface 131" concentric with the axis of said shaft 74 which also upholds said lever 131 during the major portion of the revolution of said shaft 74 in which said cam is in operative relation with said lever.

Therefore, it may be observed that said lever 131 may be upheld, in the position shown in Fig. V, by all or any of three different devices, all of which devices must release it as a consequence of the indicating dials reaching their respective zero positions, before the spring 132 of said lever 131 is permitted to pull it down to tilt the lever 120, shown in Fig. V, to release the latch 129 from its position shown in Fig. V, and thus permit said operating bar 124 to be lowered at the initiation of a dispensing operation. Those three devices are, viz., first, the stop disk 148 with its associated cam 153 on said shaft 8; second, said cam 131" on said shaft 74; and, third, the end of the cross bar 163" engaging the lug 131' of the lever 131.

When said devices upholding said lever 131 have released said lever to permit its downward movement; it is pulled downward by its spring 132, tilts the lever 120 to the extent indicated in Fig. VII, and thereby turns the latch 129 clockwise free of said lug 125', shown in Figs. V, and VII, to thus free said operating bar 124 for downward movement by the operator to initiate a liquid dispensing operation.

Said setback gears 143 and 144 being continually in mesh, respectively with said setback gear 77 on the shaft 74 and the gear 146 journaled on the shaft 43, are, of course, continually turned by the operation of the computing registering mechanism when it is actuated by the meter driven shaft 3, shown at the bottom of Fig. VI; such movement being in the opposite direction to that in which said setback gears 143 and 144 are turned by manual rotation of the setback shaft 103; but, the clutch member 108 being disengaged from the clutch member 110, shown in Fig. V, during such operation of the computing registering mechanism; rotation of either or both of said gears 143 and 144 then merely idly operates the differential gear mechanism with which they are connected, and idly turns said shaft 111 with the disconnected clutch member 110 thereon.

Referring to Fig. IX; said detent lever 32' is fulcrumed on the stud 47' fixed in said housing frame plate 47, shown at the left hand side of Fig. VI, and is provided with the spring 32" continually stressing said lever counter-clockwise to present its right hand end between teeth on the gear 72 on said shaft 74; so that, unless and until said detent lever 32' is depressed against the stress of its spring to remove said lever from engagement with said gear 72, the computing registering mechanism is prevented from turning. Such movement is effected by the turning movement of said shaft 32, which has a flattened portion which, when presented to said detent lever 32', permits it to be uplifted by its spring, but when said shaft is turned by the blade 31' to the position in which the latter is properly seated in any of the slots 30, the cylindrical portion of said shaft 32 depresses said detent lever 32' to its inoperative position and thus permits the computing registering mechanism to be then operated.

It may be observed that there are three distinct groups of means which cooperate to insure that the computing registering mechanism shall be in proper position and condition for correctly computing and registering, with reference to a predetermined price, the quantity of liquid dispensed and the value thereof, before any operation of said computing and registering mechanism is permitted, to wit, first, the means including said detent lever 32' which insures that the computing registering mechanism is set to compute at some predetermined price; second, the means including the stop lever 137 and lever arm 137' which insure that the volume indicating dials shall be at their zero position before a dispensing operation is initiated, and, third, the means including the timing cam 131" and lever 131 which insure that the value indicating dials shall be at their zero position before a dispensing operation is initiated. Although said three means are separate and distinct, they cooperate to insure that the computing registering mechanism shall not be operated unless and until each and every one of them has accomplished its purpose and separately releases said mechanism for operation. That is to say; the mechanism may be released by any one or two of said three detent devices without permitting operation of the computing registering mechanism until the third device has accomplished its function.

Therefore, I desire to claim the combination of said three devices in their cooperative relation with the computing registering mechanism. However, as far as I know, each of said devices has features of novelty per se which I desire to claim.

Therefore, I do not desire to limit myself to the precise details of construction and arrangement herein set forth, as it is obvious that various modifications may be made therein without departing from the essential features of my invention, as defined in the appended claims.

I claim:

1. In a registering mechanism; the combination with two dials each bearing a series of numbers beginning with zero; of means for advancing said dials independently of each other; means for resetting said dials to zero position despite any difference in the extent of their advancement, including a train of differential gearing connecting said dials, and normally idle while said dials are being advanced; and means normally disengaged from said train of gearing, adapted to be moved into engagement therewith, for resetting said dials successively to zero position in accordance with their relative extent of advancement.

2. Apparatus as in claim 1; wherein each dial is provided with means for stopping its rotation when it is in zero position; so that said dials are thus stopped in succession upon resetting movement thereof, in accordance with their relative advancement from zero position.

3. Apparatus as in claim 1; wherein the resetting means is operatively connected with a sun gear of the differential gearing train.

EINAR M. ORBECK.